March 10, 1959  C. M. TIETZ ET AL  2,876,588
METHOD OF PRODUCING A LIVE GRASS PACKAGE
Filed Aug. 9, 1956
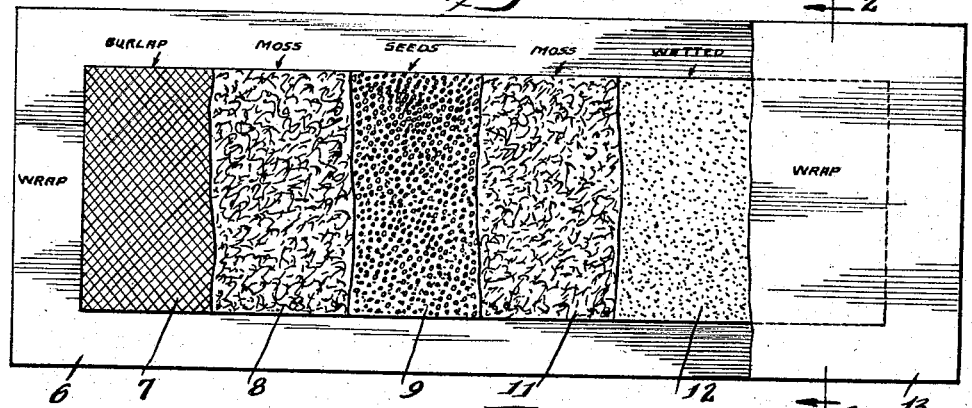
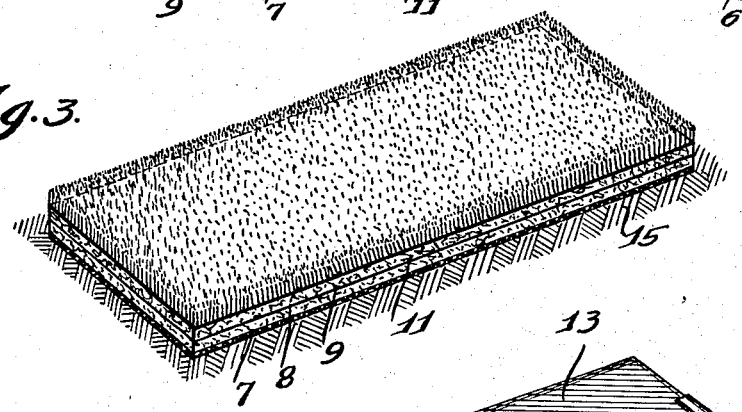
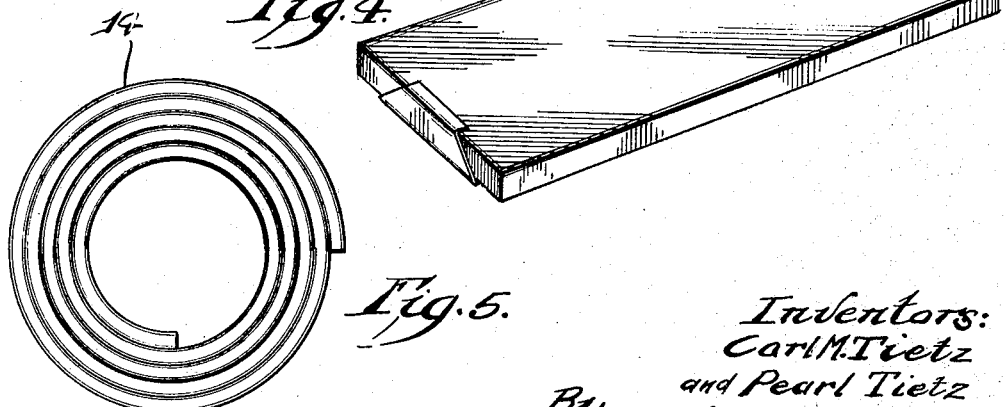
Inventors:
Carl M. Tietz
and Pearl Tietz
By Wilson & Geppert
Attorneys.

United States Patent Office 2,876,588
Patented Mar. 10, 1959

2,876,588

METHOD OF PRODUCING A LIVE GRASS PACKAGE

Carl M. Tietz and Pearl Tietz, McHenry County, Ill., assignors to Live Grass-Pack Company, a corporation of Illinois Application August 9, 1956, Serial No. 603,080

1 Claim. (Cl. 47—58)

This invention relates in general to the production of a grass covering for lawns, terraces and the like, and has for its principal purpose the production of a live grass blanket as a marketable product which can be handled and spread upon a lawn surface or the like, to which it will quickly attach itself so as to present a live, growing grass surface in an incredibly short period of time.

A further purpose of our invention is to produce economically a packaged blanket of growing grass capable of being unrolled upon a prepared lawn surface to which the previously sprouted roots of the grass plants will quickly attach themselves so as to sustain and augment the plant growth to form a uniform and evenly covered grass surface.

A further object of our invention is to provide a method by which the live grass package of our invention may be economically produced and in accordance with which the growth of other vegetation than grass may be readily and economically started and subsequently expedited.

Other objects and attendant advantages of our invention should be readily appreciated when the same is better understood by reference to the following description when considered in connection with the accompanying drawing.

Referring to the drawing,

Figure 1 is a plan view of a package produced in accordance with our invention, various layers of which have been successively stripped off and removed to expose the underlying layers;

Fig. 2 is an enlarged sectional view taken on the line 2—2 of Fig. 1;

Fig. 3 is a perspective view of the blanket of growing grass after removal from the sheath or envelope and unrolled upon the surface to be covered;

Fig. 4 is a perspective view of the sealed package containing the live blanket of our invention; and Fig. 5 is an end elevation of the package of Fig. 4 when coiled into a roll for marketing and handling.

Referring to the drawing more in detail, it will be observed by particular reference to Fig. 2 that in the production of our novel package the first step is to spread a sheet 6 of impervious material such as Saran wrap, Pliofilm or the like, preferably transparent or translucent in character, upon a flat surface. The sheet may be of any preferred size, but for average commercial purposes a width of approximately three feet and a length of approximately ten feet is suggested. Upon said wrap sheet 6 a sheet 7 of foraminous material, such as burlap or other textile material, having strength sufficient to permit the completed package to be coiled into a roll but providing openings through which the roots of the sprouted grass may find their way into the underlying soil when the unwrapped blanket of growing grass is laid upon the lawn or similar surface, is placed. The foraminous sheet is somewhat smaller in size than the wrapping sheet 6 so as to leave a surrounding margin of the wrapping sheet to be folded over and secured to form a hermetically sealed package, as will be later explained.

Upon the sheet 7 is laid a relatively thin layer of compressed or compacted material 8, such as peat moss or the like. This material should be of such a character that it can be readily penetrated by the roots of the blades when sprouted. Upon the peat moss layer 8 the seeds are evenly spread, as indicated by reference character 9. In some instances no further covering of the seeds except by the wrapping is required, but preferably, in order to retain the seeds in evenly distributed position and to provide support for the bases of the young grass blades, we cover the seeded surface with another layer of peat moss or the like, indicated by reference character 11.

The bed thus produced has been formed in dry condition, but at this point it is wetted by the application of moisture in any preferred manner but preferably by sprinkling with water containing a soluble plant food. The wetted surface is indicated in Fig. 1 by reference character 12. Over the seeded and moistened bed produced as above described, we now lay another wrapping sheet 13 of impervious material similar to the under sheet 6. The protruding margins of the sheets 6 and 13 are now folded and sealed together with a suitable adhesive carried by or applied to the sheets, and the enclosed bed thus formed is sealed in any suitable manner so as to hermetically seal the bed within the impervious wrapper. Instead of making the wrapping sheets 6 and 13 of the same size, the upper sheet 13 may be made of the same size as the bed and the margins of sheet 6 folded over the top of the upper sheet 13 and sealed by the application of heat or otherwise. The particular manner of sealing is immaterial, so long as it affords a hermetic seal for the bed enclosed within the wrapping. The package thus produced is left in flat condition until the seeds have germinated and then is coiled into a roll 14, as illustrated in Fig. 5, which may be tied or otherwise held in rolled form, and is ready for immediate shipment or for storage.

The presence of the moisture in the sealed package enables the liquid containing the plant food to be absorbed by the roots and subsequently expelled by the growing blades, whereupon, it condenses in the sheath, drops down again upon the bed and is repeatedly recirculated through the plants so that they are enabled to grow after germination at a rate dependent upon the temperature and amount of sunlight to which the package may be exposed. The growth may be expedited by heat and light or retarded, as desired, by their absence, depending upon the length of time desired to ensue before the package is opened.

When the blanket is to be spread upon the surface to be covered, it is unrolled, laid upon the surface and the impervious wrap is entirely removed, leaving the blanket with the roots contacting the underlying prepared lawn surface 15. The roots of the blades of the blanket will project themselves through the foraminous backing material down into the soil and the blades which have been restricted in their upward extension by the wrapping will very soon assume an upright position so that a thickly seeded and strong sod will be provided in a very short time and in most instances under favorable weather conditions sufficient growth will have been attained to require mowing of the lawn within ten days or two weeks after the blanket is spread on the prepared surface.

Our novel method of producing a grass blanket is not only valuable for speedily covering an area with growing grass, but it also may be employed in teaching and demonstrating to a nature study class the circulation of the moisture upwardly through the roots and stems of the plant and out into the atmosphere through the leaves where, when enclosed as it is in our method, the expelled moisture is not evaporated as it is in the open air but is condensed on the interior of the wrap and drops down to the bed where it is then absorbed and recirculated.

While we have shown and described our invention as concerned with the growing of grass blades, it should be understood that the same method may be employed in germinating and initially growing other plants than grass which do not have a stem so stiff that it would be permanently distorted by confinement in the wrap until unwrapped for use. Plants of various types may be started in this manner, packaged and marketed and subsequently transplanted. Our invention, therefore, is not restricted to the specific exemplification shown and described, but may be utilized in various ways and modified to a considerable degree without departing from the essence of the invention as defined in the following claim.

We claim:

The method of producing a live grass package, which comprises providing a backing sheet of foraminous material, depositing a seed bed upon said sheet, seeding said bed, applying moisture and plant food to the seeded bed, hermetically sealing the backing sheet, bed, seeds, moisture and plant food in an impervious sheath prior to germination of the planted seeds, retaining the sheath and its contents substantially flat until the seeds have germinated, thereafter coiling said sheath and its contents into a roll, and storing the thus formed package at a temperature suitable for plant growth until live and growing blades are developed from said seeds.

References Cited in the file of this patent

UNITED STATES PATENTS

| | | |
|---|---|---|
| 1,912,914 | O'Brien | June 6, 1933 |
| 1,971,504 | Pratt | Aug. 28, 1934 |
| 2,605,589 | Kuestner | Aug. 5, 1952 |
| 2,649,199 | Werman | Aug. 18, 1953 |
| 2,739,422 | Perkins | Mar. 27, 1956 |

FOREIGN PATENTS

| | | |
|---|---|---|
| 461,018 | Canada | Nov. 15, 1949 |
| 467,044 | France | Mar. 20, 1914 |
| 13,067 | Great Britain | of 1917 |
| 488,392 | Great Britain | July 6, 1938 |
| 510,136 | Great Britain | July 27, 1939 |